United States Patent
Lempiö et al.

(10) Patent No.: US 6,831,896 B1
(45) Date of Patent: Dec. 14, 2004

(54) SHORT RANGE RF NETWORK

(75) Inventors: Jarkko Lempiö, Nokia (FI); Miska Hiltunen, Witten (DE); Tomi Heinonen, Tampere (FI)

(73) Assignee: Nokia Corporation, Espoo (FI)

( * ) Notice: Subject to any disclaimer, the term of this patent is extended or adjusted under 35 U.S.C. 154(b) by 885 days.

(21) Appl. No.: 09/614,508

(22) Filed: Jul. 11, 2000

(51) Int. Cl.$^7$ .......................... H04L 1/00; H04L 12/28
(52) U.S. Cl. ..................................... 370/252; 370/256
(58) Field of Search ................................ 370/256, 329, 370/338, 346, 349, 351, 401, 408, 252

(56) References Cited

U.S. PATENT DOCUMENTS

| | | | | |
|---|---|---|---|---|
| 5,305,467 A | * | 4/1994 | Herndon et al. | 455/524 |
| 5,815,811 A | | 9/1998 | Pinard et al. | 455/434 |
| 5,949,760 A | | 9/1999 | Stevens et al. | |
| 6,046,992 A | | 4/2000 | Meier et al. | |
| 6,400,702 B1 | * | 6/2002 | Meier | 370/338 |
| 6,580,700 B1 | * | 6/2003 | Pinard et al. | 370/332 |
| 6,600,734 B1 | * | 7/2003 | Gernert et al. | 370/352 |
| 6,680,923 B1 | * | 1/2004 | Leon | 370/328 |

FOREIGN PATENT DOCUMENTS

| | | | |
|---|---|---|---|
| WO | WO 93/07691 | 4/1993 | ............. H04J/3/16 |
| WO | WO 98/17032 | 4/1998 | ........... H04L/12/28 |
| WO | WO 99/46899 | 9/1999 | |
| WO | WO 00/24164 | 4/2000 | ........... H04L/12/56 |
| WO | WO 00/69186 | 11/2000 | ............ H04Q/7/20 |
| WO | WO 01/13660 | 2/2001 | ............ H04Q/7/32 |
| WO | WO 0143362 | 6/2001 | ........... H04L/12/28 |
| WO | WO 01/43371 | 6/2001 | ........... H04L/12/56 |
| WO | WO 01/43372 | 6/2001 | ........... H04L/12/56 |
| WO | WO 01/69869 A2 | 9/2001 | |
| WO | WO 01/99369 A2 | 12/2001 | |
| WO | WO 02/03626 A2 | 1/2002 | |

* cited by examiner

Primary Examiner—Alpus H. Hsu
Assistant Examiner—Toan D. Nguyen
(74) Attorney, Agent, or Firm—Cohen, Pontani, Lieberman & Pavane

(57) ABSTRACT

A network including a host device and a plurality of transceiver beacons for communicating data from terminal devices interacting with the beacons, to the host. The beacons include identification codes used by the host for establishing wireless communication links either between a beacon and the host, or between two or more beacons. A routing mechanism is included in the beacons for selecting a most favorable transmission path among available paths for communicating data to the host.

41 Claims, 9 Drawing Sheets

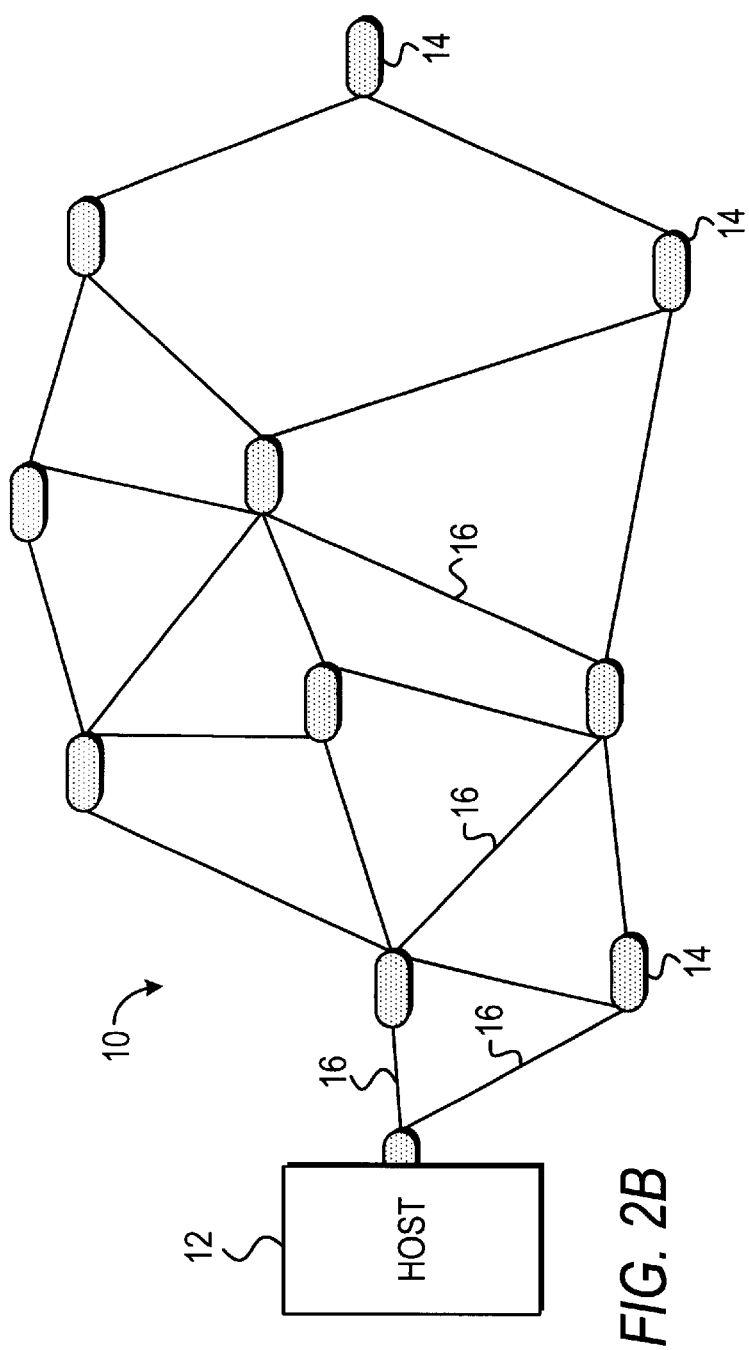
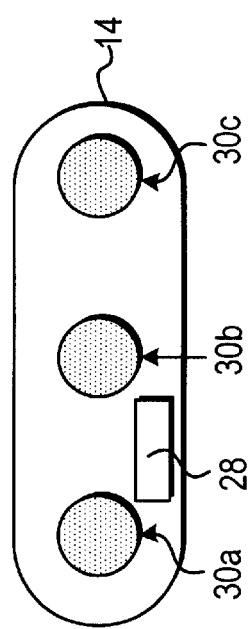
FIG. 2B
FIG. 2A

SHORT RANGE RF NETWORK

BACKGROUND OF THE INVENTION

1. Field of the Invention

The present invention relates to local communication networks and, more particularly, to a short range RF network having dynamic routing and configuration capabilities.

2. Description of the Related Art

The availability of various types of communication devices produces a need to have these devices interact with each other in a manner which is cost efficient and which can be easily implemented. Such communication can occur between two or more terminal devices (e.g. telephones, computers, printers, facsimile machines, personal digital assistants (PDAs), etc.) by wired connection such as by connecting electrical conductors to the devices, or by wireless communication using infrared signals or radio frequency (RF) signals. For many applications, RF signals are preferred as they do not require line-of-sight interaction between a transmitter and a receiver of a terminal device pair.

Recently, low power RF systems have been proposed for providing communications between a plurality of transceivers through a short range link having a broadcast range of several meters. One such local RF system is currently under development and is referred to as "Bluetooth". This system will be commercially available in the near future and is designed to operate in the open spectrum around 2.4 gigahertz. The system operating in accordance with the Bluetooth specification will allow for devices such as mobile phones, computers, and other types of terminal devices which are located within an operable range of the RF system to communicate with each other.

Wireless relay networks also exist which, in effect, extend an operating range of a local RF system by utilizing relay devices to interface with and provide communication between two or more terminal devices. Such a network is disclosed in PCT Application No. WO 98/17032 wherein a plurality of communication nodes are wirelessly connected to each other and to a host device for providing numerous communication links for data to be communicated between the host and terminal devices interfaced with the nodes. A drawback of such a system, however, is that it does not provide for the efficient use of multiple available transmission paths to select, for example, the path that contains the least amount of data traffic at any given time and hence the fast transmission time.

SUMMARY OF THE INVENTION

The present invention is directed to a short range RF network having routing capabilities for communicating data between one or more terminal devices and/or a host among a select one of a plurality of communication paths. The inventive network includes a plurality of wireless transceiver beacons and a host device. The communication paths are established between the plurality of beacons and the host when the beacons are identified to the host. The communication paths are direct or indirect between two beacons or between a beacon and a host such that a select beacon may communicate directly with a host or indirectly through one or more intermediate beacons. Some or all of the beacons include a processor for determining, prior to transmission of data, the most-desired communication path among the plurality of paths. In this manner, the speed of data transfer to and from the host can be increased by dynamically selecting through the transmitting beacon, a most-desired communication path from a plurality of available communication paths based on an amount of data traffic handled by the network at any given time.

In a preferred embodiment the inventive short range RF network includes an intermediate beacon connected between an upstream beacon and a downstream beacon and means for routing the upstream beacon to the downstream beacon in the event the intermediate beacon malfunctions or otherwise becomes disabled.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views:

FIG. 2A depicts another network topology;

FIG. 2B is a block representation of a routing beacon in accordance with a preferred embodiment of the present invention;

DETAILED DESCRIPTION OF THE PRESENTLY PREFERRED EMBODIMENTS

Figure 1:
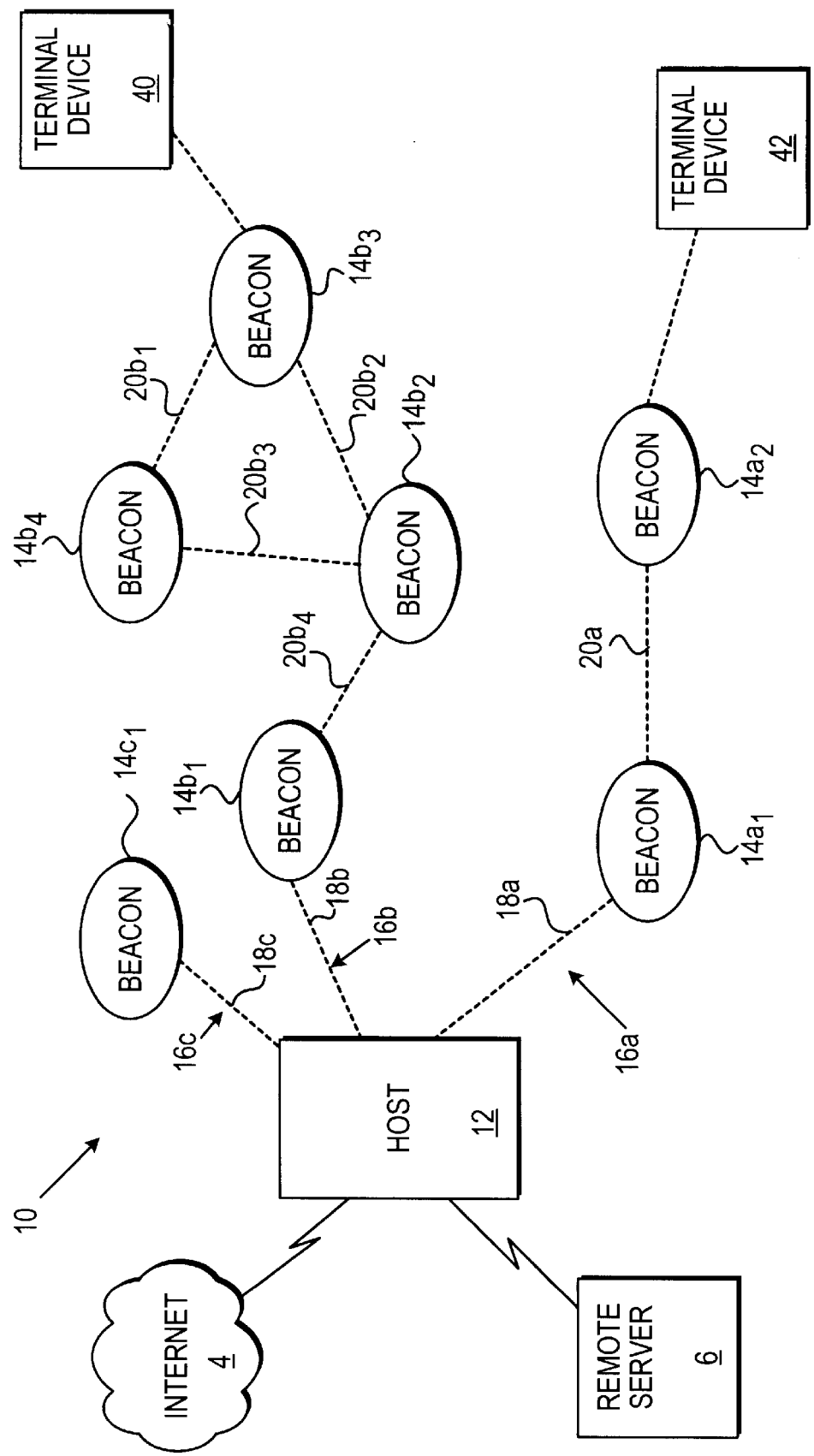
FIG. 1 is a schematic representation of a short range RF network in accordance with a preferred embodiment of the present invention.

An illustrative embodiment of a short range RF network 10 constructed in accordance with the present invention is illustrated in FIG. 1. Network 10 includes a plurality of wireless transceiver beacons 14 connected either directly or indirectly to a host 12 through a plurality of communication paths 16. In the example shown in FIG. 1, three direct paths, 16a, 16b and 16c, are generally shown for connecting the beacons 14a, 14b, 14c, to the host 12. Each communication path is made up of a direct link 18a, 18b, 18c, defined as a wireless connection between the host 12 and a beacon $14a_1$, $14b_1$, $14c_1$, and may include one or more indirect links 20a and $20b_1$–$20b_4$, defined as a wireless connection between two beacons. In the network 10, path 16a is made up of a direct link 18a between beacon $14a_1$, and host 12, and an indirect link 20a between beacon $14a_2$ and $14a_1$. Thus, beacon $14a_2$ communicates with host 12 only through the use of beacon $14a_1$, in path 16a. Path 16c includes only a single direct link 18c between beacon $14c_1$ and host 12. As for path 16b, this includes a direct link 18b between beacon $14b_1$ and host 12 and also contains a plurality of indirect links $20b_1$, $20b_2$, $20b_3$ and $20b_4$, which provide a communication path between host 12 and beacons $14b_2$, $14b_3$ and $14b_4$.

As shown in path 16b, certain beacons establish multiple communication links through which communication with the host 12 can occur. For example, beacon $14b_3$ can communicate with beacon $14b_1$, and, ultimately, with host 12 through either beacon $14b_2$ via intermediate paths $20b_2$ and $20b_4$ or through beacons $14b_4$ and $14b_2$ through intermediate paths $20b_1$, $20b_3$ and $20b_4$. As explained below, the ability to communicate along a select path from a plurality of available paths is desirable to regulate data traffic flow and increase data transmission rates.

The host 12 is responsible for routing data to the beacons in the network 10 and may interface the network 10 with an external network 4, such as the Internet, in a manner well-known to those having ordinary skill in the art to allow communication, for example, with a service provider of the network. For example, the interface can be via fiber optic or other "hard-wired" connection schemes, wireless low power RF connections (e.g. Bluetooth), cellular connection, infrared and modem. The host 12 may be a personal computer having low power RF communication ability including custom designed software for network administration. Alternatively, the host 12 can be a beacon which is designated to function or operate as a host and may be separately controlled by a remote server 6 which operates or runs software to allow the host 12 to function in an intended manner. The host and/or host with remote server 6, serves as a central maintenance unit for storing a running inventory register of beacons, as explained below, to which the host is connected, as well as the manner in which the beacons are connected to each other, e.g., through direct links 18a, 18b, 18c or indirect links 20. The inventory register can be based, for example, on Bluetooth device addresses. The host 12 may also serve as a gateway such as when an Internet connection is provided. In this event, the host will be treated by the Internet as having an associated IP address. Moreover, the host 12 can interface with one or more additional hosts (illustrated, for example, as host 12a and host 12b in FIG. 7) depending on the requirements or demands of the network 10.

Figure 2C:
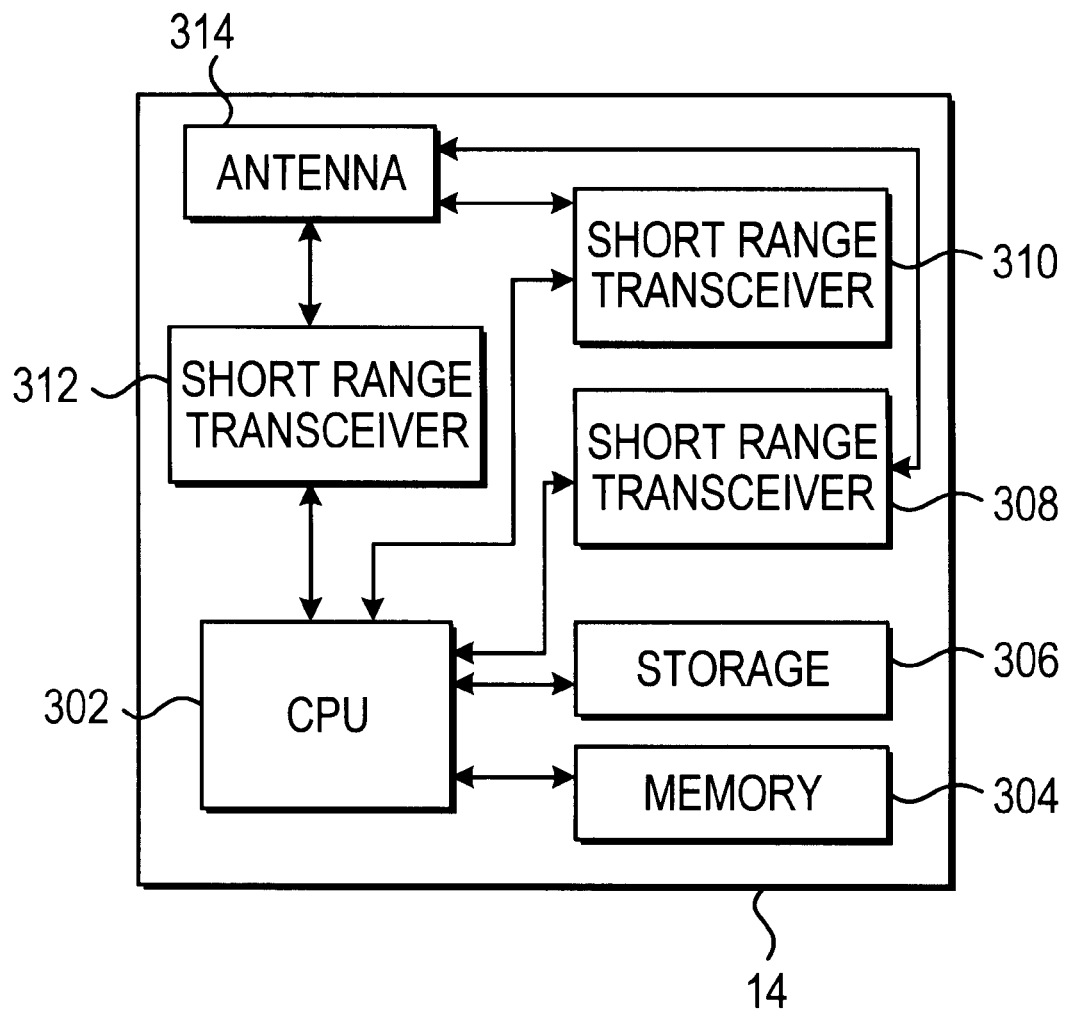
FIG. 2C is a more detailed block representation of the beacon of FIG. 2B.

The beacons 14 are relatively small, portable transceiver devices which communicate data between themselves and the host 12 along direct links 18 and indirect links 20 of communication paths 16 in the network 10. A detail of a preferred beacon device 14 is illustrated in FIG. 2C. The beacon includes a central processing unit (CPU) 302 interfaced with one or more short range transceivers 308, 310, 312 for communicating with other beacons 14 or hosts 12. A memory 304 and storage area 306 are provided for storing application software as well as data to be communicated to intended recipients. For example, if Bluetooth technology is employed, the distance between adjacent beacons in a network (i.e. the length of each link) using current technology is in the range of approximately 10 meters for a normal power mode and may be up to or exceed 300 meters for a high power mode.

With reference to FIGS. 2A and 2B, each beacon includes a control block such as a processor 28 which governs routing capabilities for directing data to a select one of multiple transmission paths depending on a data queue existing at intermediate beacons connected to the network 10. Prior to transmission of a subject message, a transmitting beacon will sense or test for the data traffic present over the available transmission paths by examining the data queue, order, or hierarchy, of data awaiting transmission over an available link at a desired time of transmission and will dynamically select the path that is most desirable. For this purpose, each beacon will also include one or more communication devices 30a, 30b, 30c for performing the necessary transmitting and receiving functions. The communication devices 30a, 30b, 30c are preferably implemented as integrated circuits and, most preferably, as Bluetooth chips with two or more such chips contained in a single beacon and serving master/slave hierarchy functions. When a pair of such chips are used, the pair functions as a master-slave for other beacons in the network 10 that are in communication with a particular beacon. When numerous beacons are installed to form a network, the master-slave connections are formed automatically as shown in FIG. 2B. Each master chip will form an independent local area receiving and transmitting beacon or piconet for communicating with terminal devices within the coverage area of the particular beacon. When a connection is made between two beacons, the identification codes associated with each beacon will be exchanged with each other. The master chip will receive data from beacons located closer to the host (upstream) and communicate the received data to slave chips on beacons located downstream, and the slave chips of a select beacon will receive data from downstream beacons and communicate such data to upstream beacons and/or to the host.

In a most preferred embodiment shown in FIGS. 2A and 2B, each beacon includes processor 28 and at least three Bluetooth chips 30a, 30b, 30c. Processor 28 will implement a message queue to determine the order in which data communication occurs by, for example, the order of message importance, preference, etc. Chip 30a may function as a slave for beacons located upstream and chip 30b may function as a master for terminal devices (e.g. PDAs, computers, mobile phones, etc.). The third chip 30c functions as a master chip for beacons located downstream from the select beacon. Although three Bluetooth chips 30 are shown, each beacon may have fewer or more chips depending on the network requirements. For example, as traffic demand through a particular beacon increases, additional master chips can be added to the beacons such that there may be multiple second chips 30b. Also, the roles of the master/slave chips can be reversed such that the master chips will receive data from downstream beacons.

Figure 3B:
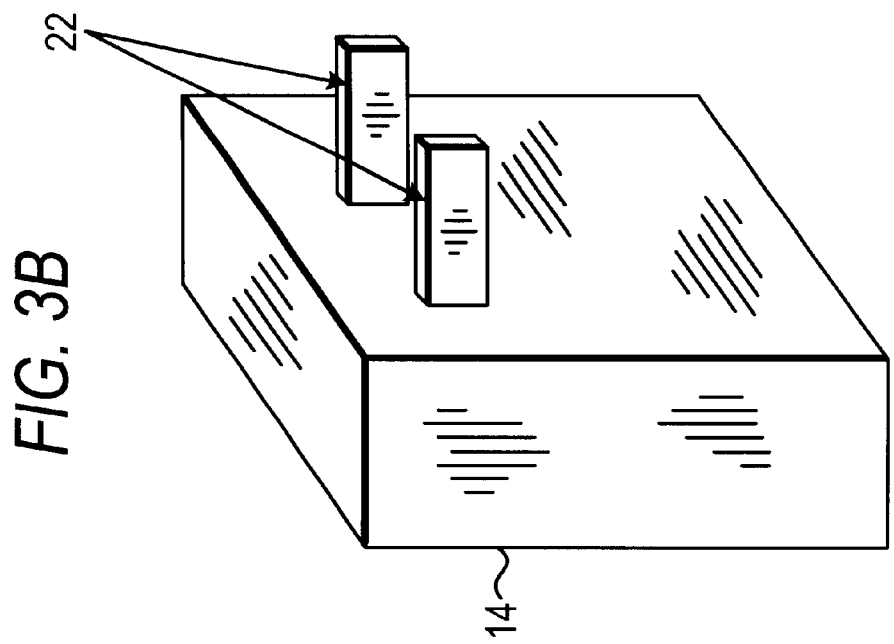
FIGS. 3A and 3B illustrate a perspective view of a beacon in accordance with the present invention.
Figure 3A:
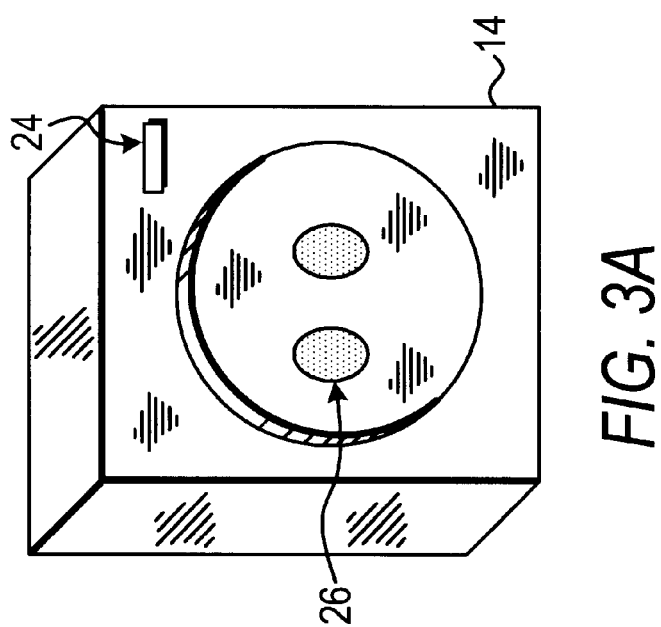

The beacons 14 may be configured for receiving operational power from battery cells, solar power or other wired/wireless power sources, or may include an electrical power interface 22 as shown in FIGS. 3A and 3B for connection to a standard electrical outlet. In a preferred embodiment, the beacons may include an electrical pass-through interface 26 to provide for connection of an additional electrical device to an outlet when the outlet is occupied by a beacon. The beacons 14 also preferably include a visual indicator 24 such as an LED for indicating a particular beacon mode such as whether the beacon is transmitting or receiving data, whether it is inactive, and whether it is properly interfaced with the network 10, by the state of the LED, i.e. on/off, color, etc.

Figure 4:
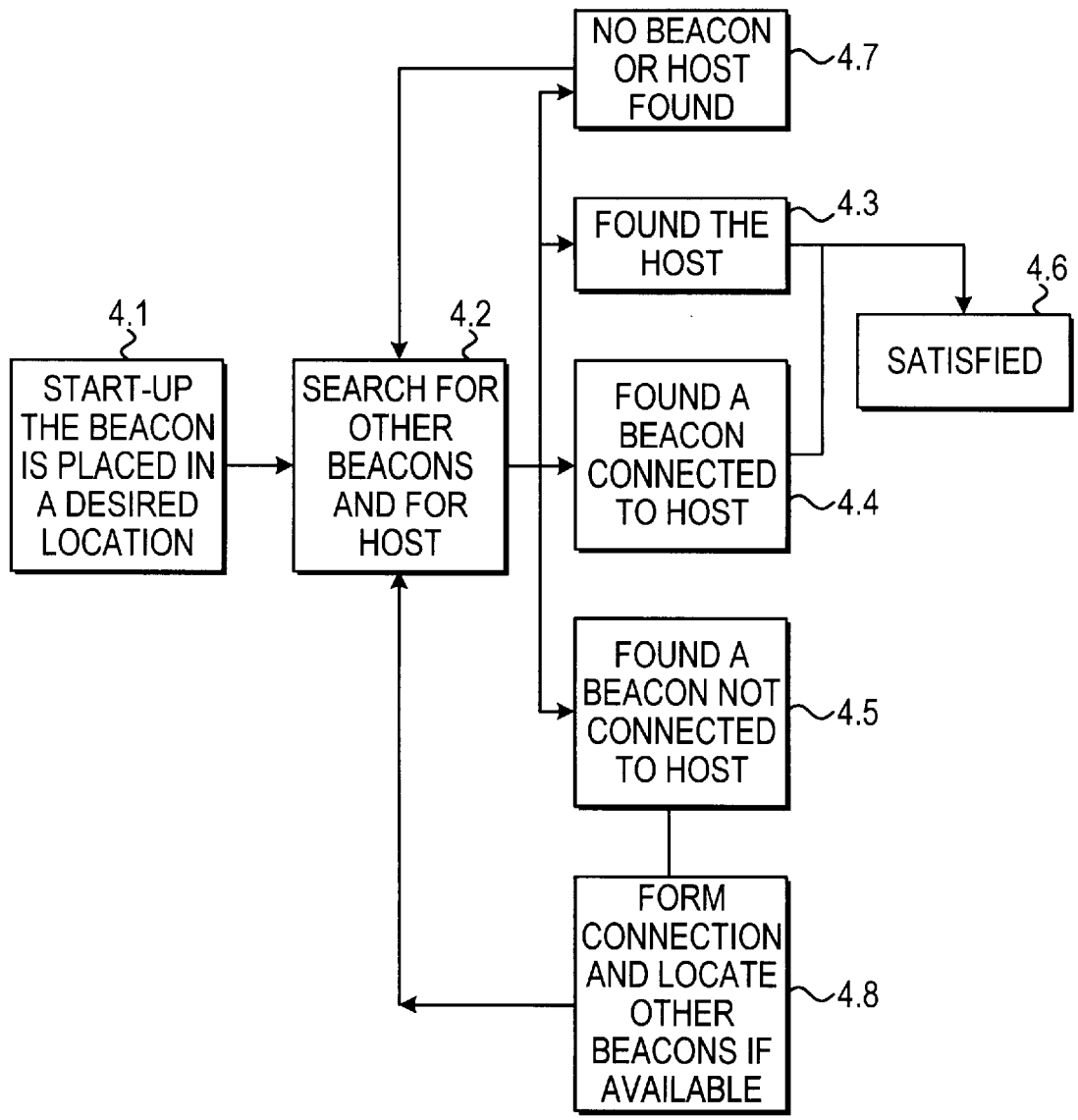
FIG. 4 depicts a flow chart of a method used for initial identification of beacons to form the network of FIG. 1.

With reference now to FIG. 4, the network 10 is established by identifying each beacon to the host 12 or to the remote server 6. Each beacon, as well as each host has a unique address or identification code. The beacon addresses are recorded by the host in an address register. This can be accomplished through manual input of a beacon address into the host register. For example, it is contemplated that each beacon will contain a visual indicator such as a label to convey to a user the address (e.g., alphanumeric characters) to allow for manual input. More preferably, identification can be accomplished by RF communication between a beacon and a host when a beacon is brought in close proximity to the host or to an existing beacon that has been previously registered to the host and incorporated in the network. In other words, the particular RF key of a beacon will be wirelessly transmitted to a host when the beacon is brought within communication range of the host. The RF key may be in the form of a unique PIN code used by a corresponding beacon to identify itself and its intended messages. The code can also be used by a network provider to access a corresponding beacon such as, for example, to remove the beacon from the network, etc.

Once the code is conveyed, the beacon will be incorporated in the network 10. After the address is known, the beacon can be taken to a desired location and activated such as by interfacing with an electrical outlet or other power source. This will commence low power RF transmission to locate a neighboring host and/or a neighboring beacon and establish direct links 18 or indirect links 20. Thus, and as shown in the process of FIG. 4, four beacon conditions are possible once a particular beacon is activated (step 4.1) and an RF locating signal is transmitted (step 4.2). If the host is found (step 4.3), a direct link 18 is established for communicating data between the beacon and the host. If a neighboring beacon that is already connected to the host is located (step 4.4), then an indirect link 20 is established with the host. If a non-connected beacon is found (step 4.5), a connection is made and an attempt is made to locate additional beacons (step 4.8). If neither a beacon nor host is located (step 4.7) the process will return to step 4.2 to locate either a host or a beacon. When a beacon successfully performs either steps 4.3, 4.4 or 4.5, the beacon is satisfied (step 4.6) and is incorporated into the network 10. It may then, optionally, seek additional beacons. Once incorporated, a wireless protocol such as IP net can be used to communicate between beacons 14 and the host 12. In a preferred embodiment, once the beacons have been added and incorporated into the network 10, a lock feature may be employed to prevent additional beacons from being added until the lock feature is disable. This can be accomplished, for example, by entering an appropriate command to the host 12 or remote server 6.

Figure 5:
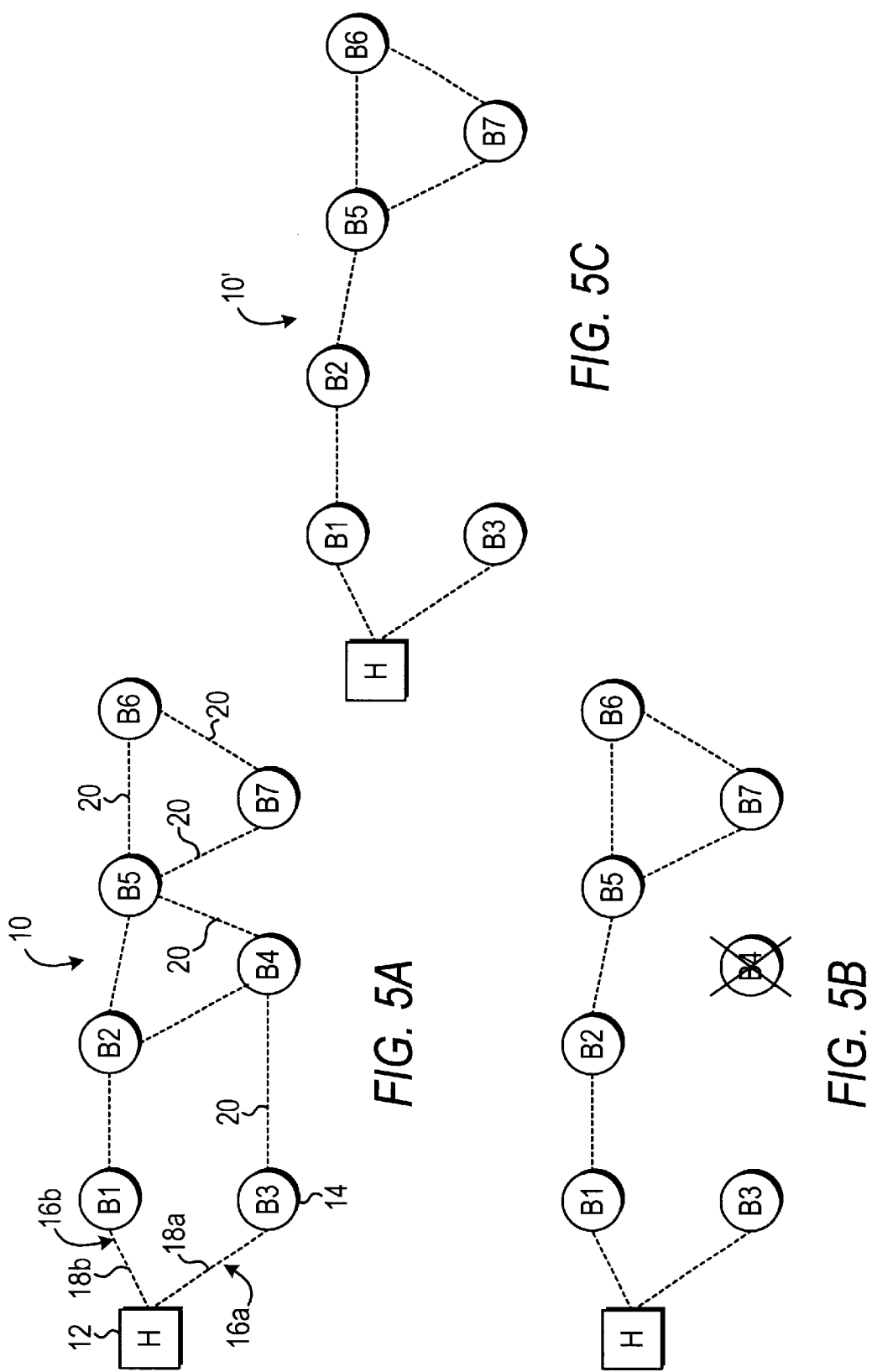
FIGS. 5A–5C are schematic representations of dynamic network topologies.

With reference now to FIGS. 5A, 5B and 5C, the network 10 is dynamically reconfigureable such that in the event of a malfunction or error occurring at a particular beacon or in the event a particular beacon is removed, the network will route data to remaining connected beacons. For example, FIG. 5A depicts the network 10 having beacons B1–B7 connected through two paths 16a and 16b to the host H. Beacons B5, B6 and B7 can communicate with the host either through beacon B2 or beacon B4. In FIG. 5B, intermediate beacon B4 has malfunctioned thereby removing this link from the network. Thus, beacons B5, B6 and B7 must now communicate with the host 12 only through beacon B2. The resulting dynamically reconfigured network is shown in FIG. 5C.

Figure 7:
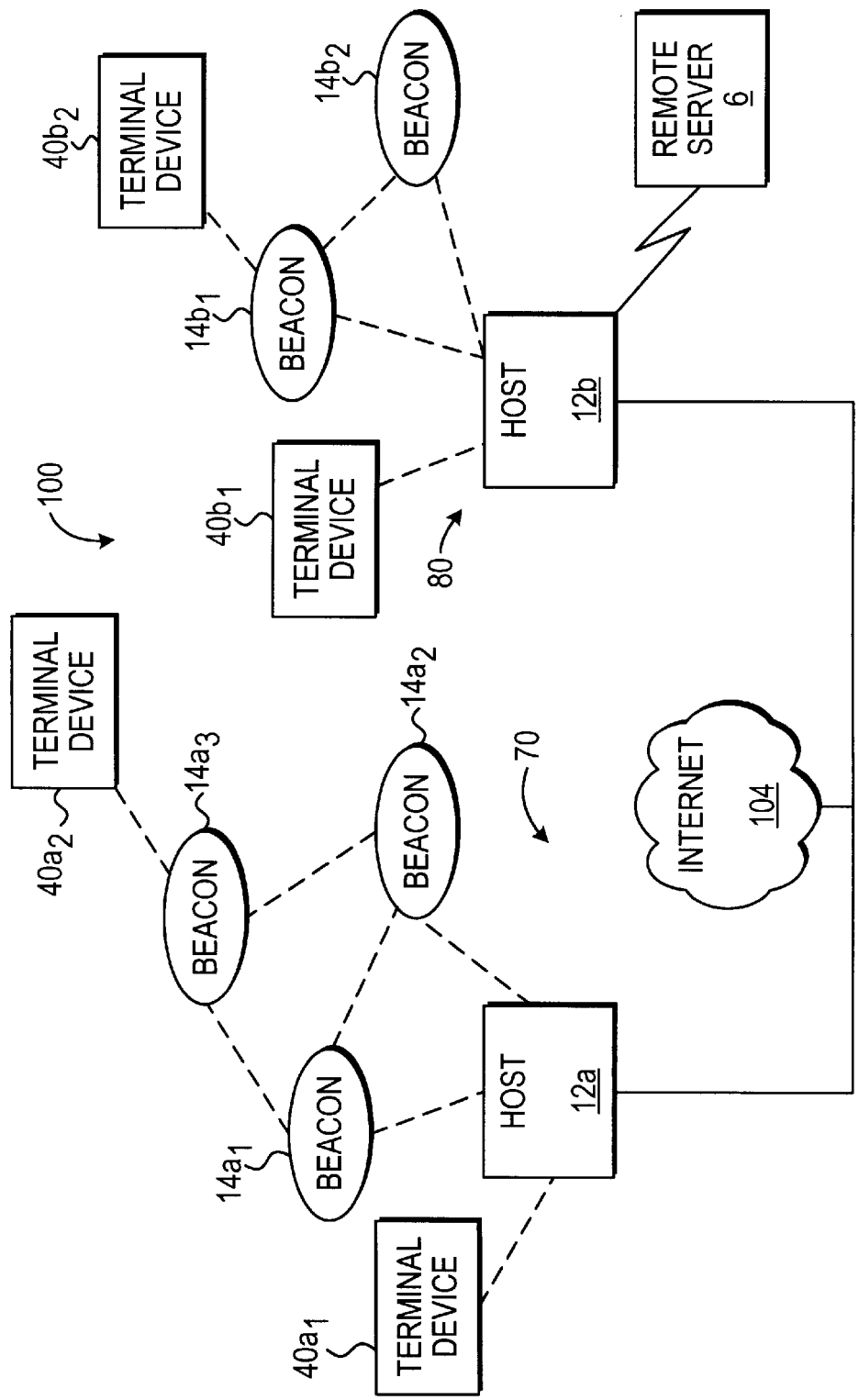
FIG. 7 is a multihost short range RF network in accordance with another embodiment of the present invention.

The beacons 14 can be used as a position reference for mobile devices as well as for other beacons in the network and will provide communication between a mobile device and a beacon or host or another terminal device connected to the network. For example, and as shown in FIG. 7, a network 100 is shown having two sections, an "a" section having beacons and terminal devices connected to host 12a, and a "b" section having beacons and terminal devices connected to host 12b. The terminal devices can communicate directly with a host (e.g., terminal device $40a_1$) or indirectly through one or more beacons (e.g., terminal device $40a_2$ though beacon $14a_3$). In this manner, the beacons serve as an access point to the network 100. Moreover, a terminal device presently in communication with section "a" may communicate with a beacon or terminal device in section "b" through signal routing between host 12a and host 12b.

Figure 8:
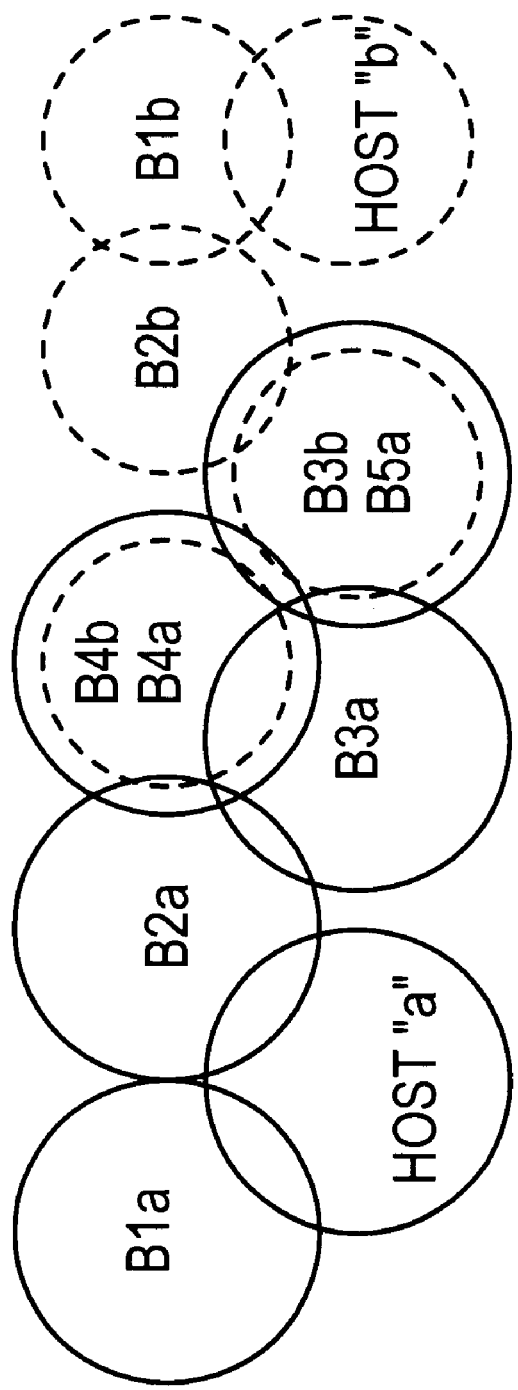
FIG. 8 is an illustration of an interaction between hosts and beacons in a multihost network.

In the multihost network system 100 shown in FIG. 7, beacons associated with different hosts can occupy the same operating region while avoiding interference with each other. Specifically, once a particular beacon is connected to or "paired" with a specific host or another beacon already paired with the specific host, the particular beacon will only communicate with beacons and/or the specific host that are in a common network. This feature is illustrated in the multi-host network of FIG. 8 shown, for example, as having a host "a" and a host "b". The beacons paired with host "a" are indicated in solid lines to show their respective operating regions, and are designated as beacons $B1_a$, $B2_a$, $B3_a$, $B4_a$, and $B5_a$. The beacons paired with host "b" are indicated in dashed lines to show their respective operating regions, and are designated as beacons $B1_b$, $B2_b$, $B3_b$, and $B4_b$. As shown, beacons $B4_a$ and $B4_b$ have overlapping operating regions, as do beacons $B5_a$ and $B3_b$. However, as the beacons are paired with respective separate to hosts, they do not interfere with each other. Alternatively, multiple hosts can operate in a single beacon network so that, for example, one or more beacons in the network can communicate with more than one host.

It will be appreciated that the terminal devices 40 are preferably mobile communication devices such as mobile telephones and are capable of changing their locations during normal use as the devices move throughout the network. Thus, although terminal device $40a_2$ is shown in FIG. 7 as being in communication with beacon $14a_3$ of section "a", it may be in communication with a different beacon or host in part "b" as the terminal device moves within the network coverage area.

Some or all of the beacons can also include functionality to operate independently of the network 10 and to communicate with mobile devices to provide or receive stored information. For example, a mobile device such as a telephone can transmit contents (e.g., a message) to a beacon for storage and forwarding to the host for processing. Likewise, a beacon positioned in a specific location (e.g., a hotel lobby, etc.) may contain stored data for transmission to mobile telephones that are present in the beacon coverage area. Such a function can be useful in advertising or for information purposes where a position of a mobile telephone can be detected through communication with a particular beacon, which will then access stored information or information obtained from the network or from the Internet 4 and transmit the information, such as an advertisement, to the mobile telephone.

Figure 6:
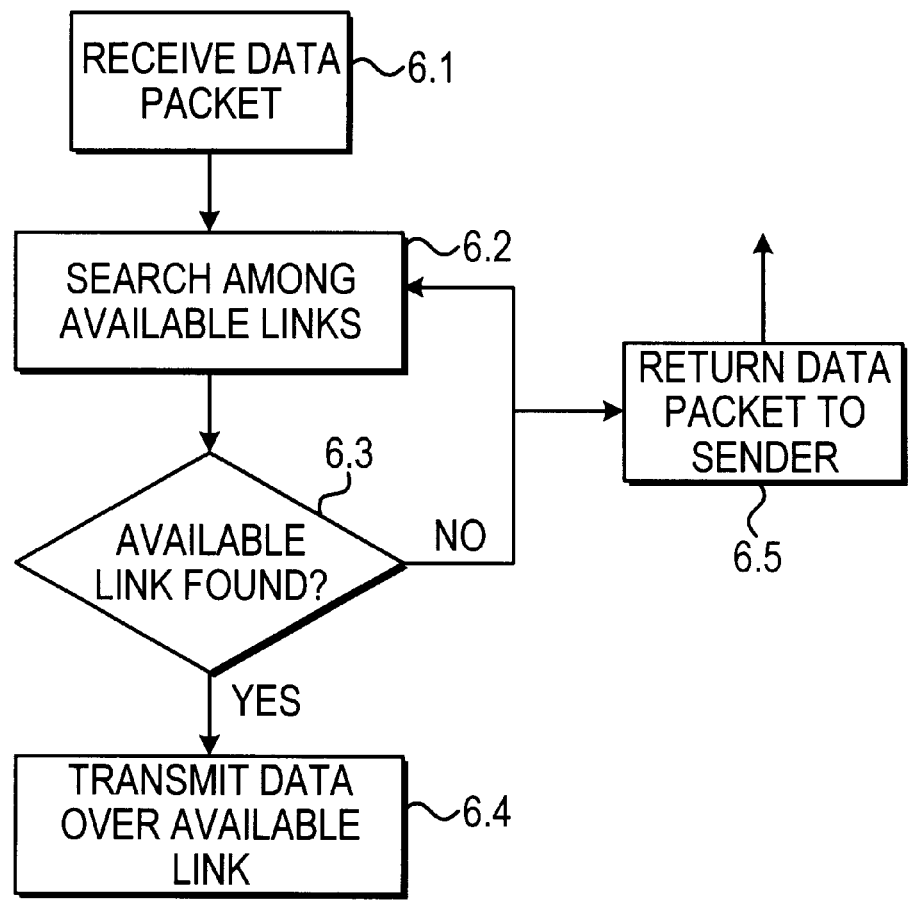
FIG. 6 is a flow chart of a routing function performed by a beacon.

The network 10 provides for the transfer of data among the beacons and the host in a most expeditious and efficient manner due to the ability of the beacons to determine a most preferred transmission path based on the current data traffic along the various direct and indirect links. This feature is illustrated in FIG. 6 which summarizes the routing capabilities. When a particular beacon (e.g. beacon $14b_3$ in FIG. 1)

is contacted by a mobile telephone, for example, a data packet is transmitted by the phone to the beacon for communication to the host (step 6.1). A search among available links is then conducted (step 6.2). If an available link is found, the data packet is transmitted (step 6.4). If no link is found, step 6.2 may be repeated for a set time after which the data packet will be returned to the originator (step 6.5). The data packet may be transmitted along with a priority indicator signifying the priority status to the receiving beacon. Alternatively, the messages may be handled in the order in which they are received, e.g., establishing a message queue.

With additional reference to FIG. 1, two links are available to beacon $14b_3$ for transmission: transmission along link $20b_2$, or transmission along links $20b_1$ and $20b_3$. Beacon $14b_3$ will determine, before transmitting the data, which of the available links is preferred for transmission. This is accomplished by each beacon transmitting status information to surrounding beacons in a continuous manner or in regular intervals so that each beacon in the network is aware of the current transmission loads or message queues carried by each beacon. This information also allows for routing tables maintained by each beacon and/or the host or hosts to be regularly updated. In this manner, a particular beacon having two or more available link transmission routes will be able to make a dynamic routing decision to determine, based on certain criteria such as load or message queue of surrounding beacons, the optimal transmission path for communicating information.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A short range RF network for providing wireless communication of data in a local environment to a wireless user terminal, comprising:
    a host device connectable to an external network;
    first primary beacon having a first operating range and disposed at a distance from said host within said operating range, said first primary beacon having a processor, a transceiver and a first identification code recognizable by the host for establishing a first wireless communication link between said first primary beacon and said host for facilitating transmission of the data along said first wireless communication link;
    a second primary beacon having a second operating range and disposed at a distance from said host within said second operating range, said second primary beacon having a processor, a transceiver and a second identification code recognizable by the host for establishing a second wireless communication link between said second primary beacon and said host for facilitating transmission of the data along said second wireless communication link; and
    a secondary beacon having a secondary beacon operating range and disposed at a distance from said first and said second primary beacons so that said first and said second primary beacons are within said secondary beacon operating range, said secondary beacon having a processor, a transceiver and a secondary beacon identification code recognizable by said host for establishing wireless communication links with said first primary beacon and said second primary beacon, said secondary beacon including means for determining whether to communicate with said host via communication with one of said first and second primary beacons depending on criteria associated with said first and said second primary beacons.

2. The network of claim 1, wherein said criteria includes a measurement of data traffic present at one of said first and said second primary beacons.

3. The network of claim 1, wherein said criteria includes a measurement of data traffic present at said first and said second primary beacons.

4. The network of claim 1, wherein one of said first and second primary beacons is at a distance closer to said secondary beacon than said other of said first and second primary beacons, and wherein said criteria includes measurement of data traffic present at said closer primary beacon.

5. The network of claim 1, wherein said determining means comprises means for conducting a periodic status check of said first and second primary beacons.

6. The network of claim 1, wherein each of said first and said second primary beacons has corresponding message queues indicating an amount and priority of data awaiting transmission at each of said primary beacons, and wherein said determining means comprises means for communicating the message queues between said first and said second primary beacons and said secondary beacon to determine a most preferred transmission path from said secondary beacon to the host.

7. The network of claim 1, wherein each of said first and second primary beacons and said secondary beacon is powered from one of an electrical outlet, solar energy and a battery.

8. The network of claim 7, wherein one of said first and second primary beacons and said secondary beacon further comprise an electrical appliance interface for powering an electrical appliance from an electrical outlet occupies by said one beacon.

9. The network of claim 1, wherein said primary and said secondary beacons are powered by battery cells.

10. The network of claim 1, wherein said primary and said secondary beacons comprise visual indicators for conveying an operation mode of said beacons.

11. The network of claim 1, wherein said primary and said secondary beacons comprise visual indicators for conveying an operation mode of said beacons.

12. The network of claim 1, wherein the host is capable of interfacing with a second host having primary and secondary beacons in communication with the second host for providing communication between a first terminal device interfaced with the host and a second terminal device interfaced with the second host.

13. The network of claim 1, wherein one of said primary and said secondary beacons include means for broadcasting a message to the wireless user terminal when the wireless terminal device is within the operating range of said one of said beacons.

14. The network of claim 13, wherein said broadcast message comprises an advertisement.

15. The wireless local area network of claim 1, wherein said first and second operating ranges are between zero and 300 meters.

16. The network of claim 1, wherein said first and said second primary beacons each comprise a plurality of primary beacons.

17. The network of claim 16, wherein said secondary beacon comprises a plurality of secondary beacons.

18. The system of claim 17, wherein said beacons are positioned at locations upstream; and downstream relative to each other, each of said beacons comprising at least three Bluetooth chips including a master chip, a slave clip, and an interface chip, each master chip being capable of communicating with a slave chip in at least one downstream beacon, each slave chip being capable of communicating with a master chip in at least one upstream beacon, and each interface chip being capable of communicating with user terminal devices located within the corresponding operating range of its respective beacon.

19. The network of claim 1, wherein said secondary beacon comprises a plurality of secondary beacons.

20. The network of claim 1, wherein said host has a host operating range, a host processor, a host transceiver and a host identification code.

21. The system of claim 1, wherein each of said beacons comprises a communication device for wirelessly transmitting data.

22. The system of claim 21, wherein said communication device in said each beacon comprises a plurality of communication devices.

23. The system of claim 22, wherein said plurality of communication devices further comprises a slave communication device and a master communication device.

24. The system of claim 22, wherein said plurality of communication devices comprises a plurality of Bluetooth chips.

25. The system of claim 21, wherein said communication device comprises a Bluetooth chip.

26. A method of wirelessly communicating data in a local environment between a host device and a wireless terminal device, comprising the steps of:

disposing a first primary beacon having a first operating range at a distance from the host within said first operating range, said first primary beacon having a processor, a transceiver and a first identification code recognizable by the host for establishing a first wireless communication link between said first primary beacon and said host for facilitating transmission of the data along said first wireless communication link;

disposing a second primary beacon having a second operating range at a distance from the host within said second operating range, said second primary beacon having a processor, a transceiver and a second identification code recognizable by the host for establishing a second wireless communication link between said second primary beacon and said host for facilitating transmission of the data along said second wireless communication link;

disposing a secondary beacon having a secondary beacon operating range at a distance from said first and said second primary beacons within said secondary beacon operating range, said secondary beacon having a processor, a transceiver and a secondary beacon identification code recognizable by the host for establishing a first secondary beacon wireless communication link with said first primary beacon and a second secondary beacon communication link with said second primary beacon; and determining, based on criteria associated with said first and said second primary beacons, which of said first secondary beacon wireless communication link and said second secondary beacon wireless communication link to use for transmission of the data from said beacon to the host via communication with one of said first and said second primary beacons.

27. The method of claim 26, wherein said determining step comprises the steps of establishing message queues for each of said first and second primary beacons and said secondary beacon to indicate an amount and priority of data awaiting transmission at each of said first and second primary beacons, and communicating the message queues to said secondary beacon to determine a most preferred transmission path.

28. The method of claim 26, wherein the host is capable of interfacing with the Internet and wherein the wireless terminal device is a mobile telephone so that the mobile telephone can communicate with the Internet through said network.

29. The method of claim 28, wherein the host is capable of interfacing with a second host having beacons interfaced with the second host.

30. The method of claim 26, wherein said criteria includes a measurement of data traffic present at one of said first and said second primary beacons.

31. The method of claim 26, wherein said criteria includes a measurement of data traffic present at said first and said second primary beacons.

32. The method of claim 26, wherein one of said first and second primary beacons is at a distance closer to said secondary beacon than said other of said first and second primary beacons, and wherein said criteria includes measurement of data traffic present at said closer primary beacon.

33. The method of claim 26, wherein said determining step comprises the step of conducting a periodic status check of said first and second primary beacons.

34. The method of claim 26, wherein each of said first and said second primary beacons has corresponding message queues indicating an amount and priority of data awaiting transmission at each of said primary beacons, and wherein said determining step comprises the step of communicating the message queues between said first and said second primary beacons and said secondary beacon to determine a most preferred transmission path from said secondary beacon to the host.

35. The method of claim 26, wherein each of said beacons comprises a communication device for wirelessly transmitting data.

36. The method of claim 35, wherein said communication device in said each beacon comprises a plurality of communication devices.

37. The method of claim 36, wherein said plurality of communication devices further comprises a slave communication device and a master communication device.

38. The method of claim 36, wherein said plurality of communication devices comprises a plurality of Bluetooth chips.

39. The method of claim 35, wherein said communication device comprises a Bluetooth chip.

40. The method of claim 26, wherein said first and second primary beacons each comprise a plurality of primary beacons and wherein said secondary beacon comprises a plurality of secondary beacons.

41. The method of claim 40, wherein said beacons are positioned at locations upstream and downstream relative to each other, each of said beacons comprising at least three Bluetooth chips including a master chip, a slave chip, and an interface chip, each master chip being capable of communicating with a slave chip in at least one downstream beacon, each slave chip being capable of communicating with a master chip in at least one upstream beacon, and each interface chip being capable of communicating with user terminal devices located within the corresponding operating range of its respective beacon.

* * * * *